United States Patent
Christie et al.

[11] Patent Number: 5,807,630
[45] Date of Patent: Sep. 15, 1998

[54] CONTROLLED PERMEABILITY FILM

[75] Inventors: Gregor Bruce Christie, Middle Park; Terence William Turney, Mt. Waverley; Simon Gerard Hardin, North Fitzroy; Victor Christov, Reservoir; Ru Yu Wu, Glen Waverley, all of Australia

[73] Assignee: Commonwealth Scientific and Industrial Research Organisation, Campbell, Australia

[21] Appl. No.: 872,954

[22] Filed: Jun. 11, 1997

Related U.S. Application Data

[63] Continuation of Ser. No. 349,469, Dec. 5, 1994, abandoned, which is a continuation of Ser. No. 978,705, filed as PCT/AU91/00346 Aug. 8, 1991, abandoned.

[30] Foreign Application Priority Data

Aug. 10, 1990 [AU] Australia .................................. PK1714
Jun. 27, 1991 [AU] Australia .................................. PK6926

[51] Int. Cl.$^6$ .............................. C08K 7/22; C08L 23/00; C08L 23/08; C08L 25/06
[52] U.S. Cl. ......................... 428/323; 428/324; 428/325; 428/330; 428/332; 428/338
[58] Field of Search .................................. 428/323, 324, 428/325, 330, 332, 338

[56] References Cited

U.S. PATENT DOCUMENTS

| | | | |
|---|---|---|---|
| 4,051,876 | 10/1977 | Foulkes | 141/1.1 |
| 4,264,672 | 4/1981 | Taylor-Brown et al. | 428/323 X |
| 4,364,985 | 12/1982 | Tokuyama et al. | 428/149 |
| 4,618,528 | 10/1986 | Sacks et al. | 428/331 X |
| 4,696,857 | 9/1987 | Sibrilia et al. | 428/331 X |
| 4,842,875 | 6/1989 | Anderson . | |
| 4,847,145 | 7/1989 | Matsui . | |
| 4,910,032 | 3/1990 | Antoon, Jr. | 426/118 |
| 4,923,703 | 5/1990 | Antoon, Jr. | 426/118 |

FOREIGN PATENT DOCUMENTS

| | | |
|---|---|---|
| 41561/89 | 3/1990 | Australia . |
| 54583/90 | 11/1990 | Australia . |
| 62-184035 | 8/1987 | Japan . |
| 63-86757 | 4/1988 | Japan . |
| 2-29465 | 1/1990 | Japan . |
| 2-58549 | 2/1990 | Japan . |
| 3-43380 | 2/1991 | Japan . |
| 2 219 185 | 12/1989 | United Kingdom . |
| WO 91/03516 | 3/1991 | WIPO . |

OTHER PUBLICATIONS

The English translation of JP63–86757, Apr. 1988.
Supplementary European Search Report for Application No. EP 91 91 4730 dated Nov. 3, 1993.
Patent Abstracts of Japan, vol. 12, No. 316 (C–524) (3163), 26th Aug. 1988; and JP–A–63 086 757 (Japan Synth, Rubber) 18 Apr. 1988 *Abstract*.
Patent Abstracts of Japan, vol. 14, No. 184, (C–709) (4127), 13th Apr. 1990; and JP–A–20 29 466 (M. Matsui) 31 Jan. 1990 *Abstract*.

*Primary Examiner*—Kathleen Choi
*Attorney, Agent, or Firm*—Merchant, Gould, Smith, Edell, Welter & Schmidt, P.A.

[57] ABSTRACT

A controlled permeability film including a film forming polymer and optionally including a dispersing polymer; and an inert porous filler optionally having a surface modifying agent coated thereon, the inert porous filler being present in an amount effective to reduce the ratio of the carbon dioxide permeability to the oxygen permeability of the film, and wherein the filler has a particle size greater than the intrinsic film thickness of the film forming polymer. A composite packaging article and a packaged produce product are also disclosed.

7 Claims, 5 Drawing Sheets

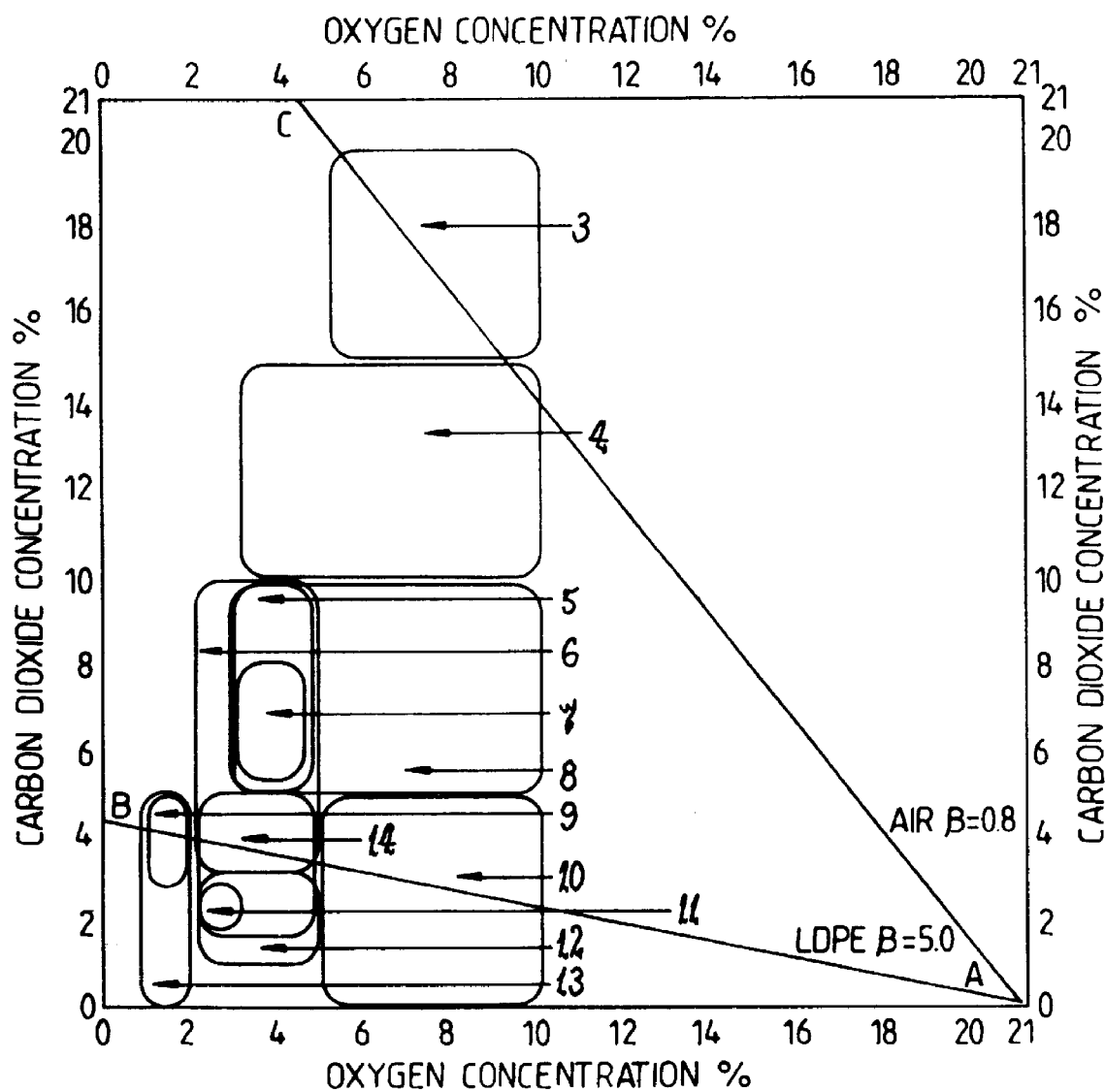

RECOMMENDED MODIFIED ATMOSPHERES FOR STORAGE OF VEGETABLES AND FRUIT

CONTROLLED PERMEABILITY FILM

This is a Continuation of application Ser. No. 08/349,469, filed Dec. 5, 1994 now abandoned, which is a Continuation of application Ser. No. 07/978,705, filed as PCT/AU91/00346 Aug. 8, 1991, now abandoned.

The present invention relates to controlled permeability film compositions for use in controlled atmosphere packaging and to the protective packaging of sensitive produce therewith.

Control of carbon dioxide ($CO_2$) and oxygen ($O_2$) concentration around produce has been shown in the prior art to increase the storage life thereof. Conditions for the optimal storage of horticultural commodities are influenced by factors which include crop species, cultivar, growing conditions, maturity, quality, temperature, relative humidity, packaging, and storage duration. Storage under controlled and modified atmosphere is influenced by the concentration of oxygen, carbon dioxide, ethylene, water vapour and other gases. Controlled atmosphere (CA) storage is achieved by externally supplying a gas stream of the required $O_2$ and $CO_2$ concentration into the storage cold room. Controlled atmosphere research into broccoli, for example, has shown that oxygen levels below approximately 1% and $CO_2$ levels higher than approximately 15% independently induce offensive off-odours and off-flavours. Reported optimum $O_2$ and $CO_2$ concentrations for broccoli range from approximately 1 to 2.5% and approximately 5 to 10% respectively. Controlled atmosphere packaging achieves extended produce life because of effects such as slowing respiration and inhibiting pathogen growth.

It is also known in the prior art that $CO_2$ and $O_2$ atmospheres surrounding produce can be modified by utilising the respiration behaviour of the produce where $O_2$ is converted to $CO_2$. With modified atmosphere (MA) packaging, produce is stored in polymeric film where the film permeability is exactly matched to the expected respiration behaviour as influenced by temperature and atmosphere changes to provide the optimum $CO_2$ and $O_2$ atmosphere. The accumulated $O_2$ and $CO_2$ concentration in such a package will be related to the rate at which $O_2$ and $CO_2$ is consumed or generated by the produce and the container permeability by a simple mass balance. The sensitivity of this balance to $O_2$ and $CO_2$ permeability and the possibility of producing commodity polymer films requires highly consistent and economic manufacturing of controlled permeability films.

In the prior art, methods of controlling film permeability include uniaxially oriented filled films disclosed in European patent application 311 423 A2, addition of mineral oil to polyolefin films disclosed in European patent application 308 106 A2, use of EVA copolymers and very low density polyethylene (Research Disclosure June 1988 p 408). Such films of controlled permeability have been partially successful, however, their success has been limited by speciality equipment needed to produce some of the films, lack of economic raw materials and difficulty in producing consistent film permeabilities. Moreover the commercial application of MA techniques has been limited due to a number of factors including cost and total quality management.

For example, modified atmosphere packaging has not been applied to highly sensitive produce such as broccoli, commercially, because of the risk of offensive odour and flavour. Many workers have attempted modified atmosphere packaging of broccoli and all results reported show $CO_2$ and $O_2$ atmospheres lower and higher respectively than the controlled atmosphere optimum range.

Accordingly it is an object of the present invention to overcome, or at least alleviate, one or more of the difficulties related to the prior art.

Accordingly in a first aspect of the present invention there is provided a controlled permeability film including
 a film forming polymer; and
 an inert porous filler in an amount effective to reduce the ratio of the carbon dioxide permeability to the oxygen permeability of the film, and wherein the filler has a particle size greater than the intrinsic film thickness of the film forming polymer.

The term "intrinsic film thickness" as used herein refers to the calculated thickness of the polymeric film. The intrinsic film thickness is the thickness the polymer would have if the filler was not there.

By the term "film" as used herein we mean a film, sheet or like article.

The film forming polymer of the controlled permeability film may be of any suitable type. The film forming polymer may be selected from polyolefins including polyethylene and polypropylene, polyesters including polyethylene terephthalate and polybutylene terephthalate, vinyl polymers including polyvinyl chloride, polyvinyl acetate, ethylene-vinyl acetate copolymers and ethylene-vinyl alcohol copolymers, polycarbonates and polystyrenes polyalkylene oxide polymers, including polyethylene oxide polymer; and blends of any of the above. Preferably the film forming polymer is a polyolefin more preferably polyethylene. A low density polyethylene is particularly preferred.

The inert porous filler may be of any suitable type. The inert porous filler may be an organic or inorganic filler. The inert porous filler may be a naturally-occuring porous material or synthetic porous material. The naturally occuring porous materials may be selected from inorganic materials, such as, pumice, tuff, rhyolite, dacite, reticulite, scoria, lapilli, agglomerate, perlite, pumicite, other volcanic rocks, natural zeolites or sandstones and organic materials, such as coal, char, charcoal, starch, seaweed, polymeric carbohydrates. The synthetic materials may be selected from porous glasses such as "Vycor", clays modified to produce porosity, silicate phases, such as, cordierite or mullite or metal oxides, such as alumina, silica, zirconia or magnesia, or cerium compounds, or hydrophilic organic polymers, such as polyvinyl alcohol or polyacrylamide. Synthetic metallic compounds such as alumina, aluminum isopropoxide and $C_e(NO_3)_3$ derivatives may be used as described below. Inorganic fillers selected from alumina, silica, pumice or derivatives thereof are preferred.

A mineral filler is preferred. A pumice product may be used. Pumice particles having a particle size greater than the intrinsic film thickness of the film forming polymer has been found to be particularly suitable (see for example FIG. 1). Whilst we do not wish to be restricted by theory, it is postulated that filler particles having a diameter greater than the intrinsic film thickness of the film forming polymer may provide improved properties including higher permeabilities, better permeability-temperature behaviour, more consistent film properties and better carbon dioxide/oxygen permeability ratios.

The film forming polymer may be present in amounts of from approximately 50 to 99.995%, preferably 85 to 99.95% by weight based on the total weight of the controlled permeability film. More preferably the film forming polymer is present in amounts of approximately 90 to 99.5% by weight based on the total weight of the controlled permeability film.

The inert porous filler may be present in amounts of from approximately 0.005 to 50%, preferably 0.05 to 15%, more preferably approximately 0.5 to 10% by weight based on the total weight of the controlled permeability film. The inert porous filler may be dispersed throughout the polymeric film.

In a preferred form, the controlled permeability film includes from approximately 50 to 99.995% by weight, based on the total weight of the controlled permeability film of a polyolefin polymer; and approximately 0.005 to 50% by weight, based on the total weight of the controlled permeability film of an inorganic filler.

In a preferred aspect of the present invention the inert porous filler may be modified to alter its permeability characteristics. The inert porous filler may be subjected to leaching and/or burning treatment to increase porosity. The inert porous filler may be modified to render it hydrophobic.

Accordingly, in a further aspect of the present invention there is provided a controlled permeability film including
   a film forming polymer; and
   a modified porous filler, including
      an inert porous filler wherein the filler has a particle size greater than the intrinsic film thickness of the film forming polymer; and
      at least one surface modifying agent coated thereon in an amount effective to modify the surface behaviour of the porous filler.

In a preferred aspect, the modified porous filler is present in an amount sufficient to reduce the ratio of the carbon dioxide to oxygen permeability of the controlled permeability film.

The surface modifying agent may reduce the adhesion of the film forming polymer to the porous filler, which may result in the formation of depressions in the film (this is evident when viewed through an electron microscope, see FIG. 4 (F3) and (F7)) and/or regions of film thinning.

The depressions may impart microperforations to the controlled permeability film. The net effect of the surface modifying agent is thus a reduction in the effective film thickness. The carbon dioxide to oxygen permeability ratio for the controlled permeability film may also be altered.

The surface modifying agent may be any suitable agent capable of modifying the surface of the inert porous filler. Preferably, the agent is suitable to render the surface of the porous filler hydrophobic. The surface modifying agent may be an organic or an inorganic polymeric material, for example polyolefins, particularly polyethylenes, and oxygenated polyethylene for example polyethylene glycols, nonyl phenyl polyethylene oxide, polyvinyl alcohols, polyvinyl acetates, paraffins, polysiloxanes and silane coupling agents, metal alkoxides such as those of titanium and aluminium, alcohols such as n-butanol, and combinations thereof.

The surface modifying agent should be used in a sufficient amount to coat at least 10% of the surface of the inert porous filler. The surface modifying agent or combination of surface modifying agents may be added in quantities greater than needed to coat the total surface so as to fill or partially fill the available pore volume.

In an alternative aspect of the present invention there is provided a controlled permeability film composition including
   a composite film including
      a film forming polymer and
      a dispersing polymer; and
   an inert porous filler in an effective amount to reduce the ratio of carbon dioxide permeability to the oxygen permeability of the film; and wherein the filler has a particle size greater than the intrinsic film thickness of the composite film.

Generally, the dispersing polymer should not be compatible with the film forming polymer so that with appropriate blowing techniques, it forms distinct sections within the composite film. The inclusion of a dispersing polymer may affect the characteristics of the polymeric film. For example, where a linear low density polyethylene (LLDPE) film has been combined with a less dense polyethylene (e.g. linear very low density polyethylene) this may lead to an increase in the oxygen permeability of the film. The inclusion of a less viscous polyethylene (e.g. high pressure low density polyethylene) may lead to a thinning of the film.

Suitable polymeric material that may be combined to form a composite film include polyolefins of differing grades. Particularly preferred polyolefins are polyethylenes and oxygenated polyethylenes, polypropylene, polyesters including polyethylene terephthalate and polybutalene terephthalate, vinyl polymers including polyvinyl chloride, polyvinyl acetate, ethylene-vinyl acetate copolymers and ethylene-vinyl alcohol copolymers, polycarbonates and polystyrene, polyalkyleneoxide polymers including polyethylene oxide polymer; and mixtures thereof.

A composite film may comprise 2 or more polymers blended together.

The most preferred blended films may be selected depending upon the desired characteristics of the film. It is preferred that a composite film comprise 30 to 99% by weight based on the total weight of the composite film of a polyolefin polymer; and approximately 1 to 70% by weight based on the total weight of the composite film of a dispersing polymer selected from polyolefins, polyesters, vinyl polymers, polycarbonates, polystyrenes, polyalkylene olefin polymers and mixtures thereof.

According to a further preferred aspect of the present invention, there is provided a controlled permeability film including;
   a composite film including
      a film forming polymer; and
      a dispersing polymer, and
   a modified porous filler including
      an inert porous filler wherein the filler has a particle size greater than the intrinsic film thickness of the composite film, and
      a surface modifying agent.

Preferably the modified porous filler is present in an amount sufficient to reduce the ratio of carbon dioxide to oxygen permeability of the controlled permeability film.

Modifications of both the composite film and porous filler may provide improved properties, for example, higher permeabilities, better permeability/temperature behaviour, more consistent film properties and better $CO_2/O_2$ permeability ratio.

In a preferred aspect the present invention there is provided a controlled permeability film including
   a film forming polyethylene polymer; and
   a modified porous filler selected from alumina, silica, pumice and scoria having a surface modifying agent coated thereon in an amount such that the $CO_2/O_2$ permeability ratio is reduced to approximately 0.5 to 5, more preferably approximately 1.5 to 4. The ratio of permeability of $CO_2$ to $O_2$ for most unmodified polymers is in the order of 4 to 6.

In a preferred aspect of the present invention the controlled permeability film may be utilised in the packaging of product including highly sensitive produce such as broccoli.

Accordingly in a preferred form there is provided a packaged produce product including;

a controlled permeability film including
a film forming polymer optionally including a dispersing polymer; and
a porous filler wherein the filler has a particle size greater than the intrinsic film thickness of the film forming polymer, optionally having a surface modifying agent coated thereon, in an amount effective to reduce the ratio of the carbon dioxide permeability to the oxygen permeability of the film; and
a produce product packaged therein.

The controlled permeability film may be utilised in the packaging of highly sensitive produce such as broccoli and the like.

The produce packaged may be of any suitable type sensitive to oxygen deterioration. The produce may be selected from Broccoli, Brussels Sprouts, Beans, Cabbage, Chicory, Celery, Cauliflower, Radish, Artichoke, Lettuce, Tomato, Pepper, Leeks, Parsley, Spinach, Asparagus, Mushroom and Okra, flowers, berries, cherry, melons, mango, papaya, pineapple, avocado, persimmon, grapefruit, kiwi, nectarine, peach, apple, banana, orange, apricot, grape, cranberry, plum, pear and nashi (see FIG. 2).

The packaged produce product has been found to exhibit improved $CO_2$/oxygen permeability such that the deterioration of the produce product is significantly reduced. It will be recognised that the atmospheric oxygen and $CO_2$ concentrations may be optimised to be within the optimum ranges for a produce product. FIG. 2 illustrates the preferred optimum windows of Carbon Dioxide concentration to Oxygen concentration for various produce items. Reported optimum $O_2$ and $CO_2$ concentrations for broccoli range from approximately 1 to 2.5% and approximately 5 to 10% respectively. It is postulated that the controlled permeability package achieves extended produce life because of a slowing in respiration and inhibition of pathogen growth.

The concentration of Carbon Dioxide will be controlled by the respiration rate of the produce less the amount of $CO_2$ released through the film. This may be expressed $$\frac{d[CO_2]}{dt} = Resp - \frac{perm\ [CO_2]\ \text{thickness of film}}{\text{area of film}}$$

The concentration of Oxygen is directly related to the permeance of the film to oxygen.

Thus variation in the ratio of permeability of $CO_2/O_2$ provides an ability to produce a film having optimum characteristics for any chosen produce.

The controlled permeability film utilised in this aspect of the present invention is preferably a polyethylene film, more preferably a low density polyethylene (LDPE) film. The porous filler utilised in this aspect of the present invention may be a pumice filler. It has been found that the broccoli product may be packaged with loadings of approximately 6 to 7 kilograms per square meter utilising the controlled permeability film according to the present invention. It will be understood that the mass of produce stored relative to the area of polymer film available for gases to pass through is an important parameter effecting internal package atmosphere. Zagory et. al. (Proc. 5th Int. CA Conference, June 14–16, 1989, Wenatchee, Washington).packaged broccoli at loadings of approximately 3.2 to 4.5 kilograms per square meter of polymeric film. Such loading ranges were found to be ineffective in producing optimum $CO_2$ and $O_2$ concentration.

Whilst the invention has been described with reference to its use as a controlled atmosphere packaging for produce it should be understood that the applications for the controlled permeability film are not restricted thereto. Controlled permeability films may also be used for:

monitoring respiration rates where respiration rate can be determined from the known permeability of the film and accumulation of respiration gases;

enhancing sorbent, scavenging, or indicating polymer additives where permeation of gases or liquids through the polymer is limiting the effectiveness of the additive;

for use in co-extruded products where the different permeabilities are required for each layer of the multilayer film;

for packaging of meat, poultry, dairy or fish products;

for packaging of medicines, pharmaceuticals, energy absorbing packaging; collapsible or elastic porosity can be built into the film simultaneously with the controlled permeability;

sachet material or similar coating material for example for containing gas sorbing or generating materials; such as sachets which may be placed inside produce container thereby modifying the atmosphere. It is possible to combine the controlled permeability film according to the present invention with other films having preferred characteristics such as high clarity or the like.

Thus according to a further aspect of the present invention there is provided a composite packaging article including a controlled permeability film including
a film forming polymer optionally including a dispersing polymer; and
a porous filler optionally having a surface modifying agent coated thereon, the porous filler being present in an amount effective to reduce the ratio of the carbon dioxide permeability to the oxygen permeability of the film, and wherein the filler has a particle size greater than the intrinsic film thickness of the film forming polymer; and
a packaging film adhered along at least one edge thereof to the controlled permeability film.

It will be understood that in this form the controlled permeability film may be used on a surface of the composite packaging article and a different packaging film on another surface. For example a high density film may be used on one surface for display purposes for example a high clarity high density polyethylene film, with the controlled permeability film on another surface.

In a still further aspect of the present invention, there is provided a composite packaging article including a controlled permeability film including a film forming polymer optionally including a dispersing polymer; and
a porous filler optionally having a surface modifying agent coated thereon, the porous filler being present in an amount effective to reduce the ratio of the carbon dioxide permeability to the oxygen permeability of the film, and wherein the filler has a particle size greater than the intrinsic film thickness of the film forming polymer; and
a sachet or like article attached to a surface of the controlled permeability film, and including a gas sorbing or generating material.

The sachet or like article may be attached to the film in any suitable manner. The sachet may be welded or attached utilising a suitable adhesive.

The gas sorbing material contained in the sachet may include a synthetic double-layered permanganate material of the type described in International Patent Application PCT/AU91/00246 to applicants.

The present invention will now be more fully described with reference to the accompanying examples and drawings. It should be understood, however, that the description following is illustrative only and should not be taken in any way as a restriction on the generality of the invention described above.

DRAWINGS

FIG. 1 shows comparative sizes of the polymer film 1 and the porous filler particles 2 which have a particle size greater than the thickness of the film.

Figure 1:
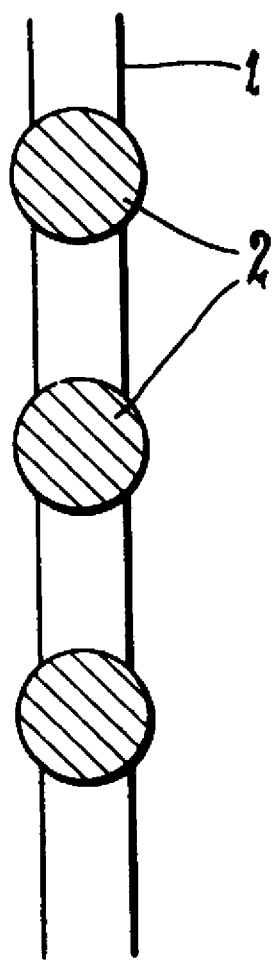
FIG. 1 represents a schematic of intrinsically thin filled polymer film.
Figure 2:
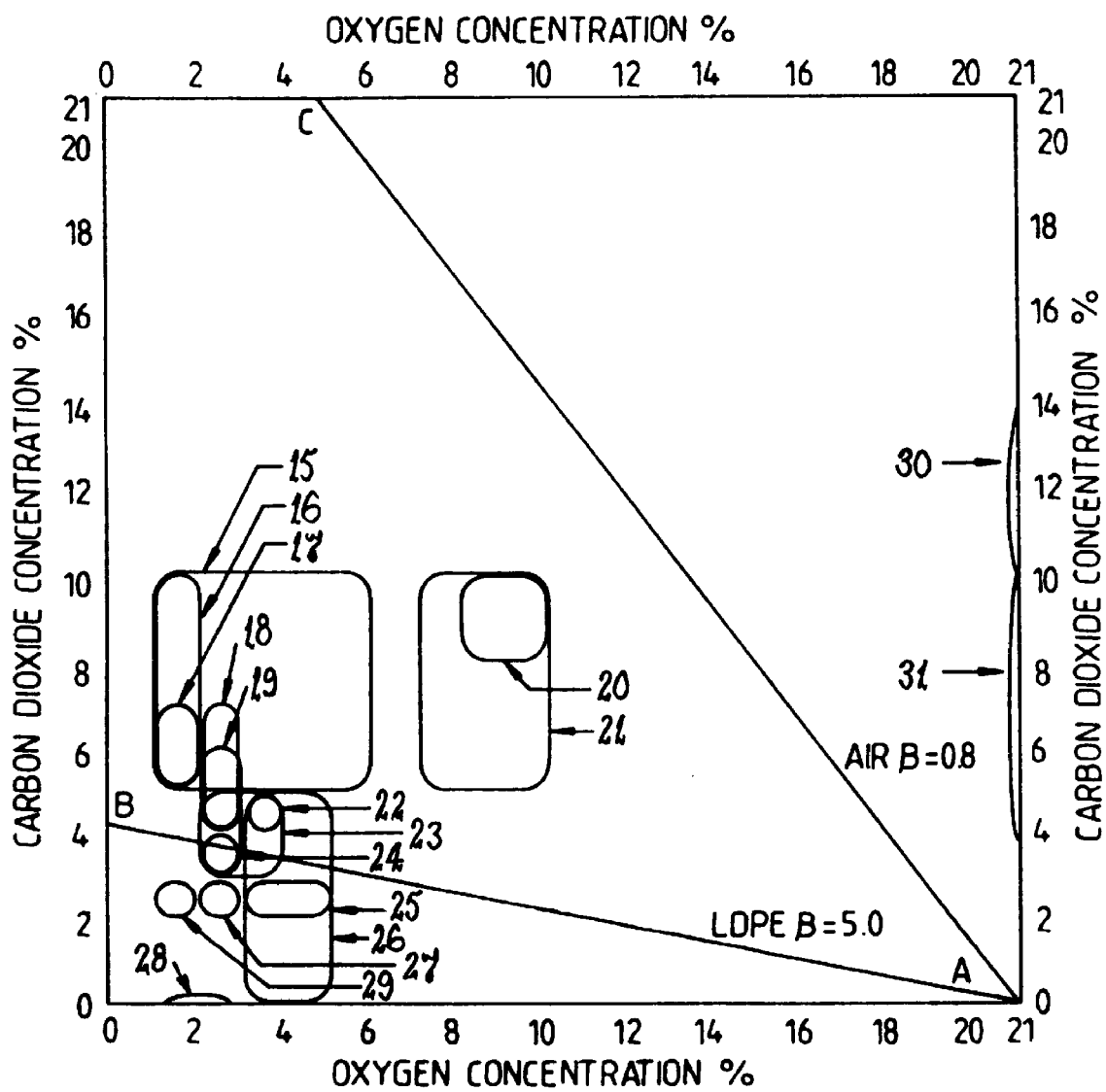
FIG. 2 is a graphical representation of preferred $CO_2$ and $O_2$ concentrations for preserving various fruits and vegetables.

FIG. 2 is a graph showing $O_2$ concentration in the horizontal axis and $CO_2$ in the vertical axis. For ease of interpretation, FIG. 2 appears in two parts, one part declining with fruit, and the other with vegetables. Each of the areas delineated on the graph indicate the maximum and minimum recommended $CO_2$ and $O_2$ levels for different fruit or vegetables, according to the following key:

No. Fruit or Vegetable
3 Blackberry, Blueberry, Raspberry, Strawberry, Fig
4 Cherry
5 Mango, Papaya, Pineapple
6 Avocado
7 Persimmon
8 Grapefruit
9 Kiwi, Nectarine, Peach
10 Orange
11 Apricot
12 Grape
13 Cranberry, Plum
14 Banana
15 Leeks
16 Broccoli
17 Brussel Sprouts
18 Beans
19 Cabbage
20 Parsley
21 Spinach
22 Chicory
23 Celery
24 Cauliflower
25 Tomato
26 Pepper
27 Artichokes
28 Lettuce
29 Radish
30 Mushrooms, Asparagus
31 Okra

EXAMPLE 1

Synthetic Filler Preparation

A. α alumina powder (diameter=0.2 μm) was slurried with 1% binder and spray dried. The powder thus formed was heated to 1300° C. at 100° C./hr held at 1300° C. for 1 hour before cooling to 40° C. over a 5 hour period. The powder was then sieved to the size range 53 to 75 μm. Powder had 25 vol % pores predominently in the 0.1 μm range.

B. 1 mole of α alumina was ground with 1 mole of $TiO_2$. The resulting powder was fired to 1400° C. for 3 hours. The powder was then sieved to the size range 53 to 75 μm. Powder had 25 vol % pores; predominantly in the 1–2 μm range.

C. 200 g of aluminium iso propoxide (Merck, Ajax) was heated in air at 600° C. for ½ hr, allowed to cool then ground. The sample was then heated to 700°C. for 18 hours, allowed to cool, then ground and sieved to the size range 53 to 75 μm. The powder had 65 vol % pores ranging from 10 to 0.01 μm.

D. 60 g of $Ce(NO_3)_3$–$6H_2O$ and 21 g of urea were ground together until liquid. The sample was put in preheated furnace at 500° C. The foam that was formed was ground then reheated to 800° C. for 2 hours. The powder was then ground and sieved to the range 53 to 75 μm. The powder head 35 vol % pore predominantly in the 1.0 to 0.1 μm size.

E. α alumina produced by method A except that the spray dried powder was heated to 1700° C. rather than 1300° C. Powder had 5 vol % pores predominantly in the 10 μm range.

Polymer Film Production

The powders were incorporated into LLDPE (118N) by compounding at 180° C. and 1.94 cc of powder per 100 g of polymer was used. In one case (powder B) the pores were filled with silicone oil (Dow Fluid 704) before compounding. The compounded polymer was then formed into film by film blowing using a 1" diameter die. The die temperature was 210° C. The settings were such that a 25 μm film would have been formed had the particles not been present. The permabilities of the films are given in Table 1. The permeabilities were calculated assuming the film thickness was 25 μm.

The compounded polymer containing synthetic powder A was further formed into film with the settings such to produce a 50 μm and 75 μm film had the particles not been present. The permeabilities for these films are given in Table 6 calculated at 50 and 75 µm respectively.

TABLE 1

| Permeability mole/m · s · Pa | | | |
|---|---|---|---|
| No Powder | 118 (25 µm) | | |
| $O_2$ | 2.7 × 10⁻¹⁵ | | |
| $CO_2/O_2$ | 4.7 | | |
| Synthetic Powder A ($\alpha\ Al_2O_3$ 1300° C.) | 118N (25 µm) | 118N (50 µm) | 118N (75 µm) |
| $O_2$ | 1.5 × 10⁻¹³ | 4.3 × 10⁻¹⁵ | 4.2 × 10⁻¹⁵ |
| $CO_2/O_2$ | 1.7 | 3.3 | 4.8 |
| Synthetic Powder B ($Al_2TiO_5$) | 118N (25 µm) | silicon + 118N (25 µm) | |
| $O_2$ | 2.0 × 10⁻¹⁵ | 1.5 × 10⁻¹² | |
| $CO_2/O_2$ | 2.5 | 1.7 | |
| Synthetic Powder C ($\gamma\ Al_2O_3$) | 118N (25 µm) | | |
| $O_2$ | 1.9 × 10⁻¹⁴ | | |
| $CO_2/O_2$ | 1.9 | | |
| Synthetic Powder D ($CeO_2$) | 118N (25 µm) | | |
| $O_2$ | 1.4 × 10⁻¹⁴ | | |
| $CO_2/O_2$ | 1.03 | | |
| Synthetic Powder E ($\alpha\ Al_2O$ 1700° C.) | | | |
| $O_2$ | 6.5 × 10⁻¹⁴ | | |
| $CO_2/O_2$ | 0.7 | | |

EXAMPLE 2

Filler Preparation 2 kg of pumice average particle size 25 micron was made hydrophobic by reluxing in 4 liters of n-butanol at 117° C. for 3 hours in closed flask fitted with a reflux condenser and then heated to dryness at 80° C.

Polymer and Filler Blending and Film Production 200 g of the above material was mixed with 1 kg of LLDPE at 180° using a twin screw extruder and pelletised. The master batch pellets were then dry blended with LLDPE and used to produce blown film at letdowns to produce 1, 2 and 5% filler loadings. The barrel temperature during production was 180°–190° C. and the die top temperature was 210° C. Four films were produced; 1% filler and intrinsic film thickness of 25 microns, 2% filler and intrinsic film thickness of 25 micron, 5% filler and intrinsic film thickness of 25 micron and 5% filler and intrinsic film thickness of 15 micron. These said films are referred to as Film1, Film2, Film3 and Film4 herein.

Permeability Testing

The above films and two commercially available produce storage films were tested for oxygen permeability using a Dow cell and the ASTM D1434-82 standard method. These commercial films are referred to herein as Comf1 and Comf2.

Produce Trials

The above films and two commercial films were used as sealed box liners to store pre-cooled broccoli at 2° C. for 28 days in 7.5 kg lots. 6 replicas were carried out for each film. The $CO_2$ and $O_2$ concentrations in the packages were measured during the 28 day period. The odour in the packages was recorded after the 28 day period.

Figure 3A:
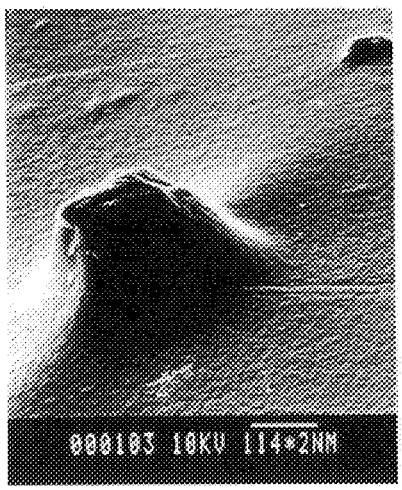
FIG. 3A (F1) is an electron micrograph of a composite film produced by mixing pellets S4 with LLDPE 50:50 having an intrinsic film thickness of 11 micron.
Figure 3B:
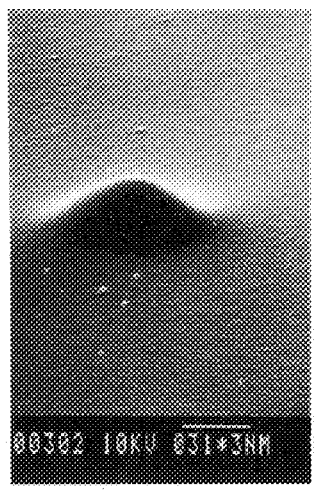
FIG. 3B (F9) is an electron micrograph of a film produced by mixing pellets S3 with LLDPE 50:50 having an intrinsic thickness of 14 micron, in the absence of a dispensing polymer.
Figure 3C:
FIG. 3C (F6) is an electron micrograph of a film produced by mixing pellets S5 with LLDPE 50:50 to produce a film having an intrinsic thickness of 13 micron and containing a polyethylene dispersing polymer (LVLDPE).
Figure 4A:
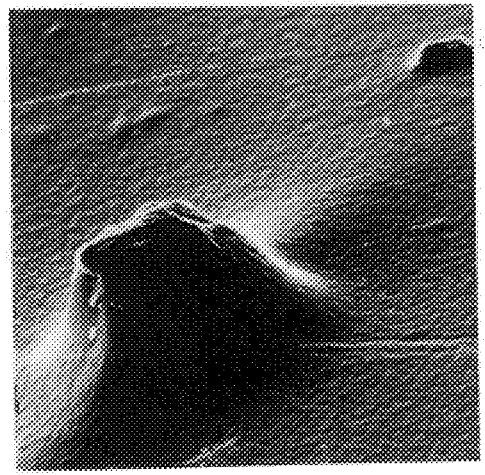
FIG. 4A (F1) is an electron micrograph of a film produced by mixing pellets S4 with LLDPE 50:50 and having an intrinsic film thickness of 11 micron but no surface modifying agent.
Figure 4C:
FIG. 4C (F3) is an electron micrograph of a film produced by mixing pellets S7 with LLDPE 50:50 and having an intrinsic film thickness of 13 micron where the inert porous filler has been treated with a surface modifying agent.
Figure 4B:
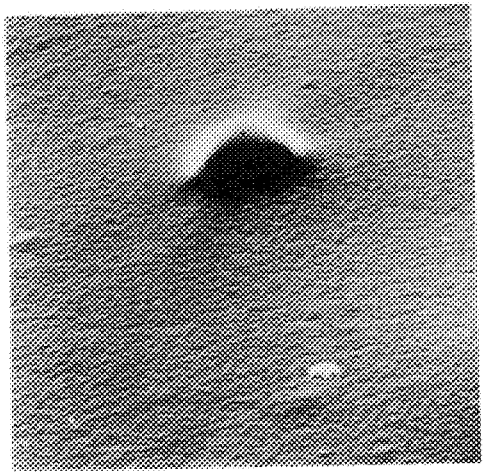
FIG. 4B (F6) is an electron micrograph of a film produced by mixing pellets S5 with LLDPE 50:50 having an intrinsic film thickness of 13 microns but no surface modifying agent.
Figure 4D:
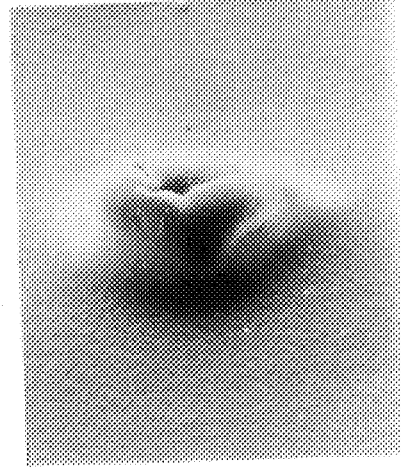
FIG. 4D (F7) is an electron micrograph of a film produced by mixing pellets S8 with LLDPE 50:50 and having an intrinsic film thickness of 14 micron where the inert porous filler has been treated with a surface modifying agent

The results are shown in Table 2 and illustrated in FIG. 3.

The intrinsically thin film produced as per Example 3 below had a permeability of $10.0 \times 10^{-16}$ mole.m⁻¹.s⁻¹.Pa⁻¹ which is approximately 30% higher than expected for the base polymer. It showed a permeability temperature dependence of −3.03%° C.⁻¹ compared to −3.45 and −4.18%° C.⁻¹ for films with similar $O_2$ permeabilities. The $CO_2/O_2$ permeability ratio was 3.91 and 3.82 at 22° C. and 2° C., 100% R.H. respectively. Table 2 shows also that the intrinsically thin filled film (film4) produced remarkably consistent results indicating the technique's ability to produce films of consistent properties.

TABLE 2

| | Film1 | Film2 | Film3 | Film4 | Comf1 | Comf2 |
|---|---|---|---|---|---|---|
| Oxygen Permeability mole/m · s · Pa (× 10⁺¹⁶) | 6.49 | 7.26 | 7.81 | 10.0 | 5.85 | 4.93 |
| $O_2$ concentration in package after 15 days storage of broccoli (%) | 0.27 | 0.24 | 0.52 | 1.56 | 0.61 | 0.25 |
| $CO_2$ concentration in package after 15 days storage of broccoli (%) | 7.18 | 9.22 | 6.83 | 5.33 | 10.7 | 24.0 |
| 2.6 times the standard deviation of the $CO_2$ replicas | 25% | 20% | 38% | 14% | 93% | 58% |
| Off odour in package after 28 days storage of broccoli | yes | yes | yes | no | yes | yes |

EXAMPLE 3

Filler Preparation

Porous carbon (Aust. Char. produced from Victorian brown coal was ground to 20 micron particle size (S1). Half the carbon was coated with silicone (S2).

Filler Dispersion

S1 was dispersed in linear low density polyethylene (LLDPE 3116) to give 5% particle loading (S3). S1 ws dispersed in high pressure low density polyethylene (HPLDPE Alkathene™ 162) to give 5% particle loading (S4). S1 was dispersed in linear very low density polyethylene (LVLDPE) to give 5% particle loading (S5). S2 was dispersed in linear low density polyethylene to give 5% particle loading (S6). S2 was dispersed in high pressure low density polyethylene to give 5% particle loading (S7). S2 was dispersed in linear very low density polyethylene to give 5% particle loading (S8).

Film Manufacture

All films were blown with a die temperature of 210° C. Film F1 was produced by mixing pellets S4 with LLDPE 50:50 and blowing a film of intrinsic thickness 11 micron. Film F9 was produced by mixing pellets S3 with LLDPE 50:50 and blowing a film of intrinsic thickness 14 micron. Film F6 was produced by mixing pellets S5 with LLDPE 50:50 and blowing a film of intrinsic thickness 13 micron.

Film F3 was produced by mixing pellets S7 with LLDPE 50:50 and blowing a film of intrinsic thickness 13 micron. Film F12 was produced by mixing pellets S6 with LLDPE 50:50 and blowing a film of intrinsic thickness 16 micron. Film F7 was produced by mixing pellets S8 with LLDPE 50:50 and blowing a film of intrinsic thickness 14 micron.

FIG. 3 illustrates a thinning of a composite film surrounding an inert porous filler (carbon) when viewed through an electron microscope. Each of the photographs illustrates a composite film using polyethylene blends. Introduction of a less viscous polyethylene dispersing polymer (Alkathene™) resulted in a thinner film relative to a more dense polyethylene dispersing polymer (LVLDPE) (F6) or to pure polyethylene in the absence of a dispersing polymer (LLDPE) (F9).

FIG. 4 illustrates the effect of treating an inert porous filler with a surface modifying agent (silcone). Composite films (F3) and (F7) show depressions within the film. The film may not have adhered to the surface of the porous filler. This compares to the smooth coating of respective composite films (F1) and (F6) that did not include a surface modifying agent, and have adhered to the porous filler.

The results tabulated in Table 3 indicate large variations in the permeability measurement resulted for composite films (F3) and (F7). This may have occurred as a result of the inconsistencies of the film. The increased permeability of the film may be due either to a thinning of the film or access through microperforations.

TABLE 4

Permeability of 3116 LLDPE - Scoria composite films for different film thicknesses to particle size ratios

| Permeability $\times 10^{-16}$ mol/m · s · Pa | Particle Size ($\mu$m) | | |
|---|---|---|---|
| Film Thickness ($\mu$m) | Blank | 106–75 | 75–53 | 53–38 |
| 15 | 7.1 | 32.0 | 29.0 | 15.7 |
| 25 | 6.0 | 8.1 | 14.5 | 9.4 |
| 46 | 7.8 | 7.9 | 9.5 | 9.0 |

A significant increase in film permeability of 4 to 5 times was achieved using a 15 $\mu$m film and particle sizes ranging from 106 $\mu$m to 53 $\mu$m. This may further extend the uses of polyethylene for produce packaging.

Notable changes in permeability were also observed when the film thickness was decresed while the particle size was held constant. In each of the three cases an increase in permeability was observed.

A general decrease in permeability was noted for the decrease in particle size for any of the three film thicknesses.

Effect of Particle Porosity and Film Thickness to Particle Diameter Ratio

Table 5 demonstrates that control of the $CO_2/O_2$ permeability ratio can be achieved by varying the film thickness to

TABLE 3

Effect of variation of LLDPE - Carbon interface of composite film and variation of coating of polymer onto Carbon particles of 25 mm in diameter

| Dispersing Polymers | | | Film (+ Disp. Polymer) | | | Film (+ Disp. Poly. + Silicone) | | |
|---|---|---|---|---|---|---|---|---|
| Type | Visc. | Perm | Film | Thickness | Perm $\times 10^{-16}$ | Film | Thickness | Perm $\times 10^{-16}$ |
| HPLDPE | 0.8 | 6.2 | F1 | blank 11 $\mu$m comp. 28 $\mu$m | 6.2 | F3 | blank 13 $\mu$m comp. 21 $\mu$m | 8.5–80 |
| LLDPE | 1.0 | 6.2 | F9 | blank 14 $\mu$m comp. 37 $\mu$m | 6.2 | (F12) | blank 16 $\mu$m comp. 33 $\mu$m | 14.5 |
| LVLDPE | 1.25 | 18.0 | F6 | blank 13 $\mu$m comp. 30 $\mu$m | 7.2 | F7 | blank 14 $\mu$m comp. 25 $\mu$m | 6–24 |

EXAMPLE 4

Scoria produced from volcanic lava rock and supplied from Attunga Horticultural Co., 57 Redford Road, Reservoir, 3073, Victoria, had the following characteristics:

Bulk Density=1.5434 g/cc

Median Pore Diameter (vol)=39.1 $\mu$m

Pore Volume Fraction=0.45

Scoria was dispersed in linear low density polyethylene (LLDPE) at 180° C. for ten minutes to give 8% particle loading.

Effect of Film Thickness to Particle Diameter Ratio

One of the experiments performed showed the relationship between film thickness and particle diameter and how these effect the permeability and permeability ratios of carbon dioxide to oxygen. Tests were carried out under constant volume fraction of the porous particle, with results listed in Table 4.

particle diameter rato. The films blown with scoria as porous fillers exhibit a range of carbon dioxide to oxygen ratios from 1.5 to 3.7.

TABLE 5

Permeability and $CO_2$ to $O_2$ permeability ratios of 3116 LLDPE porous particle composite films with different film thickness to particle size ratios (Particle diameter used was 75 to 53 mm)

| Permeability mol/m · s · Pa Film Thickness | $O_2$ Permeability $\times 10^{-16}$ | $CO_2/O_2$ |
|---|---|---|
| 15 $\mu$m | 29.0 | 1.5 |
| 25 $\mu$m | 14.5 | 3.0 |
| 50 $\mu$m | 9.5 | 3.7 |

EXAMPLE 5

Effect of Different Types of Coating Material on $CO_2/O_2$ Permeability Ratio

The permeability ratio can be changed by the addition of surface modifying agents (physically and chemically) onto the particles. Table 6 shows the effect of coated particles in the film on permeability of oxygen and carbon dioxide. Permeability had decreased in sample 1 compared with sample 11 may be due to the blockage of porous surface of scoria by LLDPE. Sample 2 to 8 except 6 shows that the surface modifying agent chemically or physically react with scoria by which LLDPE could not block the porous surface of the scoria and hence again the permeability of $O_2$ and $CO_2$ almost same as LLDPE (sample 11). Compared with all samples the value of the permeability ratio of sample 6 was the lowest. Aluminium-sec-butylate was used as a surface modifying agent with scoria.

TABLE 6

Effect of different types of coating material on $CO_2/O_2$ permeability ratio

| Sample Description of LLDPE Film Blended with 8% Scoria (53–74 μm) | | Intrinsic Film Thick. (μm) | Permeability $\times 10^{-16}$ mol/m · s · Pa | | |
|---|---|---|---|---|---|
| Sample Number | Types of Coating Chemicals used | | $O_2$ | $CO_2$ | $CO_2/O_2$ |
| 1 | Nil | 25 | 5.7 | 21.5 | 3.8 |
| 2 | Mould release | 25 | 9.9 | 41.5 | 4.2 |
| 3 | Silicon oil | 25 | 10.0 | 34.7 | 3.5 |
| 4 | Methyl-trichloro-silane | 25 | 10.5 | 34.8 | 3.3 |
| 5 | Trichloro-octadecyl-silane | 25 | 10.4 | 37.5 | 3.6 |
| 6 | Aluminium-sec-butylate | 25 | 25.7 | 58.8 | 2.3 |
| 7 | Polyethylene-glycol | 25 | 9.4 | 30.2 | 3.2 |
| 8 | Polyvinyl-acetate | 25 | 10.0 | 34.4 | 3.5 |
| 9 | Polyethylene glycol (wet) | 25 | 7.3 | 34.0 | 4.7 |
| 10 | Polyvinyl-acetate (wet) | 25 | 11.3 | 45.0 | 4.1 |
| | No particles | 25 | 9.6 | 38.1 | 4.0 |

Comparison between samples 7,9 and 8,10 shows that when samples 7 and 8 are immersed into water for two weeks, water adsorbs into the film and changes the permeability of the film, and hence the permeability of sample 9 and 10 changed and the permeability ratio increased.

Finally, it is to be understood that various other modifications and/or alterations may be made without departing from the spirit of the present invention as outlined herein.

We claim:

1. A controlled permeability film including a film forming polymer; and an inert porous filler in an amount in the range of from 0.005 to 2% by weight of the total film, the amount of filler being effective to reduce the ratio of the carbon dioxide permeability to the oxygen permeability of the film compared with a film without the inert porous filler; and wherein the filler has a particle size greater than the intrinsic film thickness of the film forming polymer.

2. A controlled permeability film according to claim 1, including from approximately 50 to 99.995% by weight, based on the total weight of the controlled permeability film of a polyolefin polymer; and wherein the filler is an inorganic filler.

3. A controlled permeability film according to claim 2, wherein the polyolefin polymer is a low density polyethylene.

4. A controlled permeability film according to claim 3 wherein the inorganic filler is selected from the group consisting of alumina, silica, scoria, and pumice.

5. A controlled permeability film according to claim 1, including:

(a) a film forming polyethylene polymer; and, (b) a modified porous filler selected from the group consisting of alumina, silica, pumice and scoria, having a surface modifying agent coated thereon in an amount such that the $CO_2/O_2$ permeability ratio is reduced to approximately 0.5 to 5.

6. A controlled permeability film according to claim 1 wherein the filler is present in an amount of from 0.005 to 1% by weight of the total film.

7. A controlled permeability film formed by a process comprising blowing a composition comprising:

(a) a film forming polymer;

(b) an inert porous filler in an amount in the range of 0.005 to 2% by weight of the total film and the amount being effective to reduce the ratio of carbon dioxide permeability and oxygen permeability of the film compared with a film without the inert porous filler;

and wherein the filler has a particle size greater than the intrinsic film thickness of the film forming polymer.

* * * * *